June 2, 1942.  R. M. EIDAL  2,284,646
CONFINED SPRING MOUNTING MEANS
Filed July 31, 1940
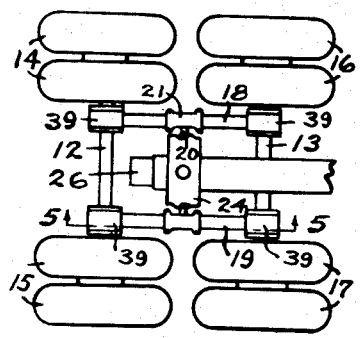
Fig. 1
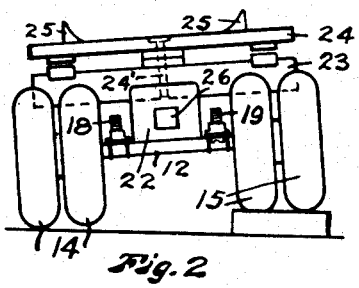
Fig. 2
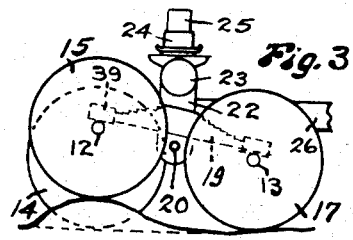
Fig. 3
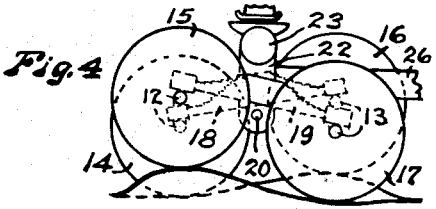
Fig. 4
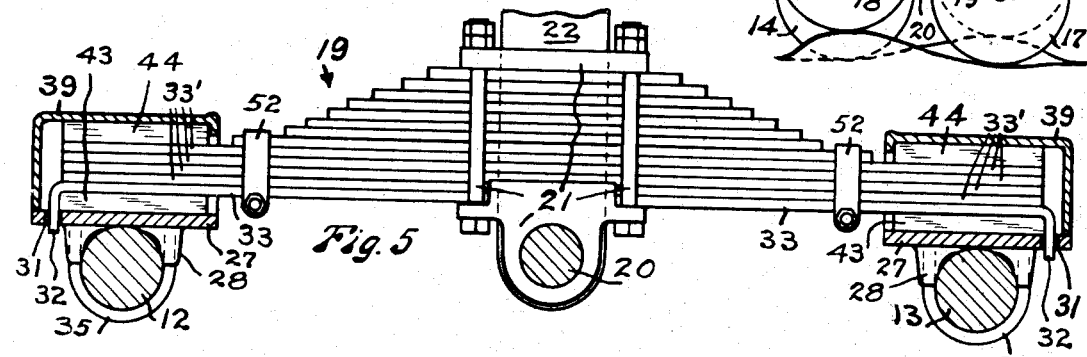
Fig. 5
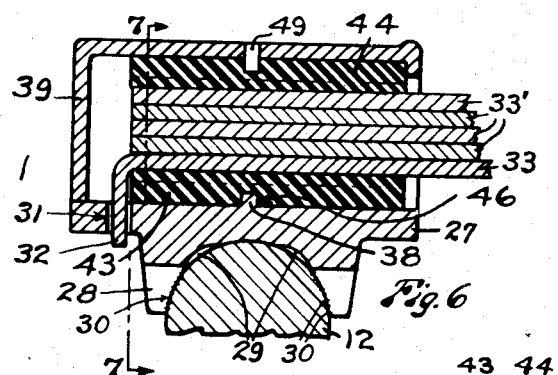
Fig. 6
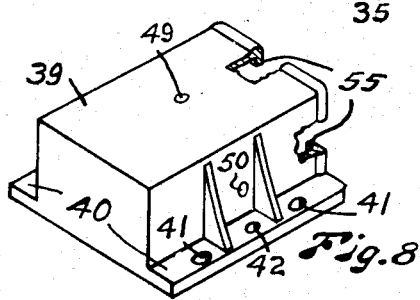
Fig. 8
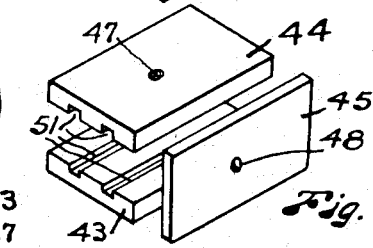
Fig. 9
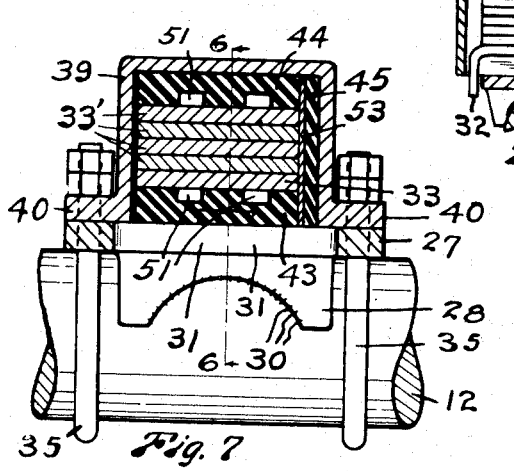
Fig. 7 · Fig. 11
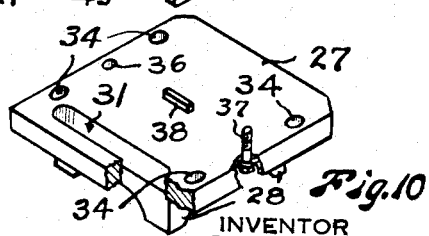
Fig. 10
INVENTOR
Roy M. Eidal
BY
G. Wright Arnold
ATTORNEY Patented June 2, 1942

2,284,646

UNITED STATES PATENT OFFICE 2,284,646

CONFINED SPRING MOUNTING MEANS

Roy M. Eidal, Seattle, Wash.

Application July 31, 1940, Serial No. 348,950

7 Claims. (Cl. 267—54)

My invention relates to a confined spring mounting means. More particularly my invention relates to an anchored spring mounting means especially designed for use in a truck or trailer mechanism having two axle units.

For purposes of illustration and definiteness of description, my invention will be set forth as applied to a heavy duty logging truck or trailer having four pairs of wheels rearward of the engine, and to the conditions under which the same operates, but it is to be understood that my invention is not to be limited to any such specific use but is applicable to situations where like conditions obtain in whole or part.

Ordinarily a logging trailer designed to carrying a load of fifteen to twenty tons is a truck device having in addition to the wheels supporting the power plant, four pairs of wheels—i. e., a pair on the end of each of two axles. These axles have spring means supporting a trunnion, and on the trunnion is mounted the trailer frame. On this frame is pivotally mounted the bunk having cheese blocks. A reach pole some ten inches square and fifteen feet long connects this trailer to the engine or power part. Manifestly, such a device will meet obstacles, as rocks on one side of the road, so that one pair of wheels will be caused to rise or be displaced upwardly as much as ten or more inches, while the rest of the three pairs of wheels are being held firmly upon the ground by reason of the heavy load. Hence, a great flexing of the mechanism results. Also, in the unloading of the logs the common practice is to violently run the load upon what are termed "jumping blocks" fourteen to eighteen inches high located in the line of travel of the wheels on one side of the road, opposite to the "brow" log along the embankment of the stream or lake. After the cheese blocks have been released on the "brow" log side, the load is run violently upon these "jump blocks." The sudden elevating of one side of the truck throws the logs off laterally and with such force as to clear the "brow" log. Here, it will be apparent that the leading pair of wheels will be first greatly lifted from the ground and then the following pair on the side of the load elevated. All this imposes extremely heavy flexing stresses when loads of fifteen to twenty or more tons are being dislodged in unloading.

Also when the brakes, usually air operated, are set upon such a trailer with a heavy load, there is a turning torque developed in the axles of great magnitude as the inertia of the load of several tons is overcome, and this requires further provision for movement of the parts in the spring mounting means.

To overcome such torque and to tie the axles together, torque rods are commonly employed. To allow for the displacement of one pair of wheels while the other three are on the ground or same level plane, ordinarily it is arranged to have the end portions of the spring leaves freely movable in a cage so they can rise off their bearing in accommodating themselves to the displacement occurring in the mounting laterally and oppositely disposed. This movement causes a great deal of wear on the parts concerned. Also it causes the wheels to get out of alignment as respects the longitudinal axis of the trailer.

This type of equipment in the logging operations is required to take much abuse. Such equipment should be made so that it does not require lubrication and at the same time will not suffer rapid wearing by the omission of lubrication. Such equipment in common use, so far as the spring mounting means, is soon worn out and is of exceptionally short life.

In general, the object of my invention is to provide a confined or anchored spring mounting means which takes into account these various requirements and which overcomes the said difficulties involved.

The present invention overcomes the difficulties hereinbefore set forth and has been proven to solve such difficulties by actual use in the logging industry by the invention herein set forth. It does this by providing means for connecting the ends of a leaf spring to a support, such as an axle, in such a manner as to secure great flexibility in the connecting means and at the same time form a positive and efficient confined or anchored connection with the axles or like members, which connection is very durable, does not require any lubrication, and makes it possible to use the leaf spring to withstand the torque incident to the use of brakes without necessitating the use of torque rods and to preserve substantially correct alignment of the wheels.

In accordance with this invention the ends of the leaf spring are set in rubber in such a manner as to provide great flexibility in all directions where flexibility is needed, and the leaf spring is used to form a positive connection between two axles so that the two axles are always maintained substantially parallel and correct alignment of the wheels insured with respect to the longitudinal axis of the trailer mechanism.

The above mentioned general objects of my invention, together with others inherent in the same, are attained by the devices illustrated in the following drawing, the same being preferred exemplary forms of embodiment of my invention, throughout which drawing like reference numerals indicate like parts:

Figure 1 is a somewhat diagrammatic plan view on a small scale of a logging trailer embodying this invention, parts being broken away;

Fig. 2 is a somewhat diagrammatic end elevation of the same illustrating the flexibility required in the spring mountings to allow the wheel or wheels at one side of the trailer to be elevated so as to tilt the trailer and discharge logs therefrom;

Fig. 3 is a somewhat diagrammatic side elevation of said trailer showing the wheel or wheels at one end of one axle elevated as in going over a hump in the roadbed and illustrating the flexibility of this invention in taking care of both a tilt and a twist in the trailer;

Fig. 4 is a view similar to Fig. 3 showing the wheel or wheels at one end of one axle elevated on a hump in the roadbed and the wheel or wheels at the opposite end of the other axle positioned in a rut or depression to thereby illustrate the operation of this invention in taking care of a double tilt and an unusually severe twist in the trailer springs;

Fig. 5 is a view partly in section and partly in elevation substantially on broken line 5—5 of Figure 1 and on a larger scale than Figure 1, showing a complete leaf spring having, at each end, a mounting constructed in accordance with this invention;

Fig. 6 is a longitudinal sectional view, taken on line 6—6 of Fig. 7, of this leaf spring mounting means;

Fig. 7 is a sectional view with parts in elevation taken substantially on broken line 7—7 of Fig. 6;

Fig. 8 is a detached isometric view of a housing member for this spring mounting means, parts being broken away to illustrate interior constructions;

Fig. 9 is an exploded isometric view of three rubber pads used in this spring mounting;

Fig. 10 is a detached isometric view of a spring bearing plate, parts being broken away; and Fig. 11 is a fragmentary view in elevation of a modified form of the invention showing the leaf spring means movably engaging a base plate without a slot or opening in said base plate.

Figs. 1 to 4 show a heavy logging trailer having this invention embodied therein. This trailer comprises two spaced apart parallel axles 12 and 13 having four wheels or sets of wheels 14, 15, 16 and 17 operatively connected with the respective end portions thereof. In the present instance I have shown four sets of wheels with each set comprising two wheels. Obviously single wheels with one tire each or with more than one tire each may be used in place of each set of wheels herein shown. Also in some instances the two axles may be built into a truck or other vehicle and one or both of the same may be driven.

The two axles are connected with each other by two leaf springs designated generally by numerals 18 and 19. A transverse trunnion 20 is connected with the two leaf springs 18 and 19 by shackle means 21 and extends crosswise of the trailer immediately below the leaf springs 18 and 19 and mid-way between the two ends of said leaf springs. A support 22 is secured to said trunnion 20 and extends upwardly therefrom. A rigid transverse bolster 23 is fixedly secured to the support 22 and a pivoted bolster or bunk 24 is secured by a king pin 24' to the support 22. Adjustable cheese blocks 25 are provided on the bolster 24 for the purpose of retaining logs thereon. A reach pole 26, shown broken away in Figure 1, is provided for connecting the trailer to any suitable power vehicle.

The mounting means for connecting the end portions of the leaf springs 18 and 19 to the axles are all of duplicate construction.

Each mounting means comprises a supporting or base plate 27, Figs. 5, 6, 7 and 10, having integral saddle lugs 28 on the bottom portion thereof adapted to rest upon and fit the curvature of an axle, such as the axle 12. Preferably the axle fitting parts of the saddle lugs 28 are curved to fit the axles and have relieved portions 29, as best shown in Fig. 6, to provide for a three point contact between the saddle lugs and the axles. When the saddle lugs are thus relieved it is found that one supporting plate 27 may be used on axles of different size within a limited range, as for instance, the same plate will fit either an axle of four and one half or five inch diameter. Also the lower edge of each saddle lug 28 is preferably curved upwardly between its two ends, see Fig. 7, and the portion thereof that engages the axle is welded to said axle by welding, as indicated by lines 30 in Fig. 7 and Fig. 6.

The base plate 27 is preferably provided near its rear edge with a transverse slot 31 for the reception of a downwardly extending end portion 32 of a lower spring leaf 33. Also plate 27 is provided adjacent each side with two holes 34 for the reception of U bolts 35 and with a hole 36 for the reception of an ordinary bolt 37. The hole 36 is directly above and in close proximity to the axle when the plate 27 is on an axle and said hole 36 is countersunk on the bottom side of the plate 27 to receive the head of the bolt 37. Preferably this countersink for the head of the bolt 37 is of hexagonal or square shape to keep the bolt 37 from turning. An integral lug 38 is provided substantially in the center of the top surface of the base plate 27 to help position and hold a rubber pad 43 on said plate as hereinafter set forth.

A rectangular box shaped housing member 39 open at the bottom and at one end is provided for cooperation with supporting plate 27 to receive the end portion of a leaf spring. The housing 39 has outwardly directed bottom flanges 40 adapted to rest on the bearing plate 27 and provided with U bolt receiving holes 41 and other holes 42 adapted to register with the corresponding holes 36 and 37 in the plate 27.

Three pads 43, 44 and 45 of elastic material, such as rubber, are provided for use within the housing 39 and on the base plate 27. The pad 43 rests on the plate 27 and forms an elastic support between the plate 27 and the lower leaf 33 of the spring. A plurality of other spring leaves 33' are positioned on the lower leaf 33 and extend into the housing 39. The pad 44 rests on the uppermost leaf 33' and forms an elastic cushion between the leaves 33' and the top wall of housing 39. The pad 45 is positioned between the edges of the spring leaves 33 and 33' and one side wall of the housing member 39. Preferably a thin metal plate 53 is provided between the side pad 43 and the spring leaves 33—33' as shown in Fig. 7 to prevent chafing of the pad 43 by the edges of the spring leaves. The lower pad 43 has a recess 46 that fits over the lug 38 on the plate 27 and prevents displacement of this pad. The pads 44 and 45 have holes 47 and 48 that fit over dowel pins 49 and 50 respectively in the housing 39 to help prevent displacement of these pads. Preferably longitudinal grooves 51 are provided in the sides of the pads 41 and 42 that contact the spring leaves to augment the resiliency of the pads, but the same are not essential.

Preferably shallow inwardly directed flanges 55 are provided on the otherwise open forward end of the housing 39 to help retain the pads 44 and 45 therein.

A plurality of successively shorter spring leaves are provided on the spring leaves 33' in the usual manner. A spring clamp 52 is preferably provided around the spring leaves adjacent the inner end of each spring mounting means.

In practice the spring leaves may be straight from end to end or they may be curved or arched longitudinaly in a manner common in leaf springs. The drawing herein shows straight spring leaves but it will be understood that this invention is equally well applicable to spring leaves that are curved or arched longitudinally.

The downwardly bent end portions 32 of each lower spring leaf 33 extend through the springs or slots 31 in the base plate 27 of the respective axles and limits movement between the springs and the base plate 27.

An alternative construction is shown in Fig. 11, where the slot 31 of the leaf springs 33 is eliminated. The bent end portions 32 of the springs 33 extend over an edge of the base plate 27 and the housing 39 is positioned in close proximity to such bent end portions 32. In view of the similarity in the parts, the same numbers are used.

I have thus shown means to movably connect the springs 33 with the base plate 27 so that longitudinal movement between the same is limited. Obviously other mechanical expedients to provide such connection will be readily apparent to those skilled in the art, the above merely showing preferred forms.

By my construction as a whole, I positively but flexibly connect each end of each spring with the axle on which it rests. Also my construction as a whole provides for that ample flexibility and at the same time the two axles 12 and 13 are connected together just inwardly from the wheels by the lower spring leaves 33 so that the axles are always maintained parallel and the sets of wheels kept in correct alignment.

When a load is supported on the trailer the weight will be transmitted to the axle through the lower pads 43 and the resiliency of these pads added to the resiliency of the springs 18 and 19. At the same time any upward movement or throw of the end portions of the leaf springs will be arrested and cushioned by the upper pads 44 and side play will be prevented by the side pad 45. This side pad 45 always tends to hold the ends of the springs in the correct or adjusted position and in this way helps to maintain correct wheel alignment with respect to the longitudinal axis of the trailer mechanism.

If one wheel or set of wheels is elevated onto a hump, as shown in Figs. 2 and 3, the leaf springs which form the connection between the two axles will be subjected to a twisting strain. Obviously, the same twisting strain will obtain if one wheel or set of wheels drops into a rut. Under this condition the resilient pads 43, 44 and 45 will flex and yield and permit twisting of the leaf springs without distortion or wear of metal to metal parts. This prevention of severe twisting strains in the leaf springs helps to prevent crystallization of these springs and increases their useful life. A condition of more intense twisting strain may be created if the wheel or wheels at diagonally opposite ends of the axles 12 and 13 are elevated onto humps or drop into depressions at the same time, as illustrated in Fig. 4. The spring mountings of this invention will take care of this condition of extreme twist.

All of the conditions above set forth are common occurrences in the use of heavy hauling equipment of all kinds.

The almost total absence of metal to metal contact in this spring mounting renders lubrication unnecessary and obviates difficulties heretofore arising through neglect of lubrication.

Also it will be noted that my construction eliminates all torque rods heretofore essential in prior art constructions used to prevent turning of the axles upon a turning moment being developed in the axles upon applying the brakes or power.

Obviously, changes may be made in the forms, dimensions and arrangement of the parts of my invention, without departing from the principle thereof, the above setting forth only preferred forms of embodiment.

I claim:

1. A device of the class described comprising a base plate provided with an opening therein; rubber cushioning means disposed on said base plate; leaf spring means disposed on said rubber cushioning means and provided with a downwardly extending end portion projecting into said opening in said base plate; rubber cushioning means disposed on said leaf spring means; and housing means connected to said base plate and extending over said last mentioned rubber cushioning means, thereby flexibly anchoring said leaf spring means to said plate means.

2. A device of the class described comprising a base plate; rubber cushioning means disposed on said base plate; leaf spring means disposed on said rubber cushioning means; metallic slot forming means connected with said base plate and providing a slot extending in a plane substantially at right angles to the longitudinal axis of said leaf spring means; metallic longitudinal thrust preventing means carried by said leaf spring means and slidingly mounted in said slot forming means; and means connected with said base plate and extending over said leaf spring means, whereby said leaf spring means is held in vertically flexible and longitudinally fixed relation to said base plate.

3. A device of the class described comprising a base plate; rubber cushioning means disposed on said base plate; leaf spring means disposed on said rubber cushioning means; metallic slot forming means connected with said base plate and providing a slot extending in a plane substantially at right angles to the longitudinal axis of said leaf spring means; metallic longitudinal thrust preventing means carried by said leaf spring means and slidingly mounted in said slot forming means; rubber cushioning means disposed on said leaf spring means; and means connected with said base plate and extending over said last mentioned rubber cushioning means, whereby said leaf spring means is held in vertically flexible and longitudinally fixed relation to said base plate.

4. A device of the class described comprising a base plate; rubber cushioning means disposed on said base plate; leaf spring means disposed on said rubber cushioning means; metallic slot forming means connected with said base plate and providing a slot extending in a plane substantially at right angles to the longitudinal axis of said leaf spring means; metallic longitudinal thrust preventing means carried by said leaf spring means and slidingly mounted in said slot forming means; rubber cushioning means laterally disposed as respects said leaf spring means operating to maintain the leaves of said leaf spring means in alignment; and means connected with said base plate and extending over said leaf spring means and said last mentioned rubber cushioning means, whereby said leaf spring means is held in vertically flexible and longitudinally fixed relation to said base plate.

5. A device of the class described comprising a base plate; rubber cushioning means disposed on said base plate; leaf spring means disposed on said rubber cushioning means; metallic slot forming means connected with said base plate and providing a slot extending in a plane substantially at right angles to the longitudinal axis of said leaf spring means; metallic longitudinal thrust preventing means carried by said leaf spring means and slidingly mounted in said slot forming means; rubber cushioning means laterally disposed as respects said leaf spring means operating to maintain the leaves of said leaf spring means in alinement; metal plate means disposed between said leaf spring means and said last mentioned rubber cushioning means and functioning as a shield preventing the leaf spring means chafing said rubber cushioning means; and means connected with said base plate and extending over said leaf spring means and said last mentioned rubber cushioning means, whereby said leaf spring means is held in vertically flexible and longitudinally fixed relation to said base plate.

6. A device of the class described comprising a base plate; rubber cushioning means disposed on and secured to said base plate; leaf spring means disposed on said rubber cushioning means; metallic slot forming means connected with said base plate and providing a slot extending in a plane substantially at right angles to the longitudinal axis of said leaf spring means; metallic longitudinal thrust preventing means carried by said leaf spring means and slidingly mounted in said slot forming means; and means connected with said base plate and extending over said leaf spring means, whereby said leaf spring means is held in vertically flexible and longitudinally fixed relation to said base plate.

7. A device of the class described comprising a base plate; leaf spring means disposed over said base plate; metallic slot forming means connected with said base plate and providing a slot extending in a plane substantially at right angles to the longitudinal axis of said leaf spring means; metallic longitudinal thrust preventing means carried by said leaf spring means and slidingly mounted in said slot forming means; rubber cushioning means disposed on said leaf spring means; and means connected with said base plate and extending over said rubber cushioning means, whereby said leaf spring means is held in vertically flexible and longitudinally fixed relation to said base plate.

ROY M. EIDAL.